Patented Apr. 18, 1933

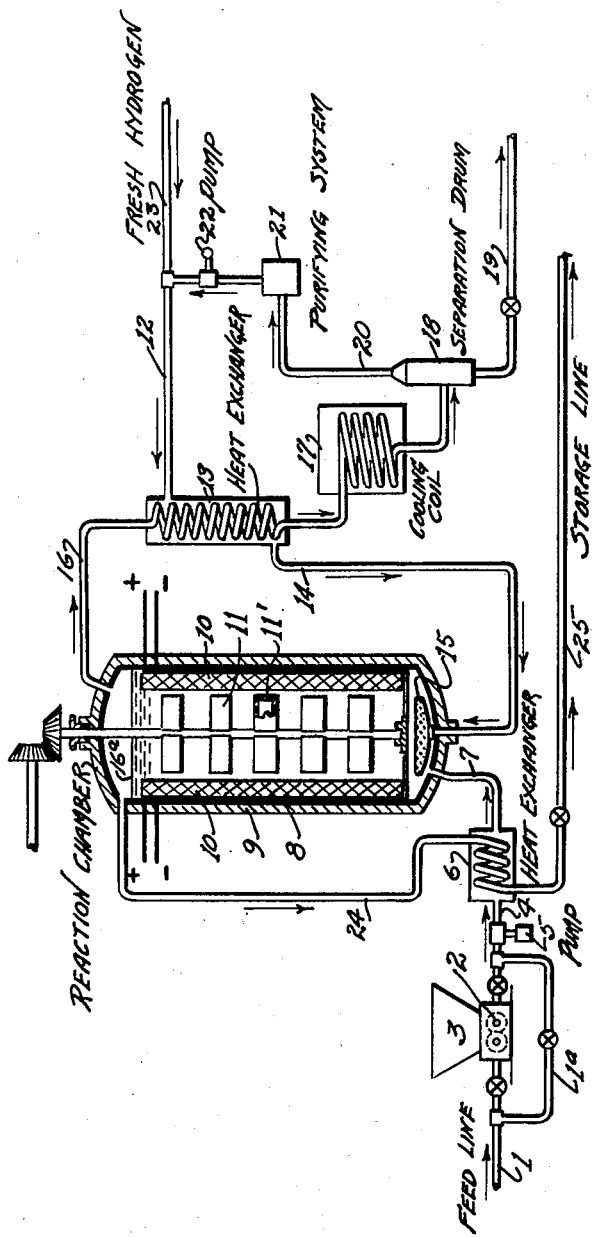

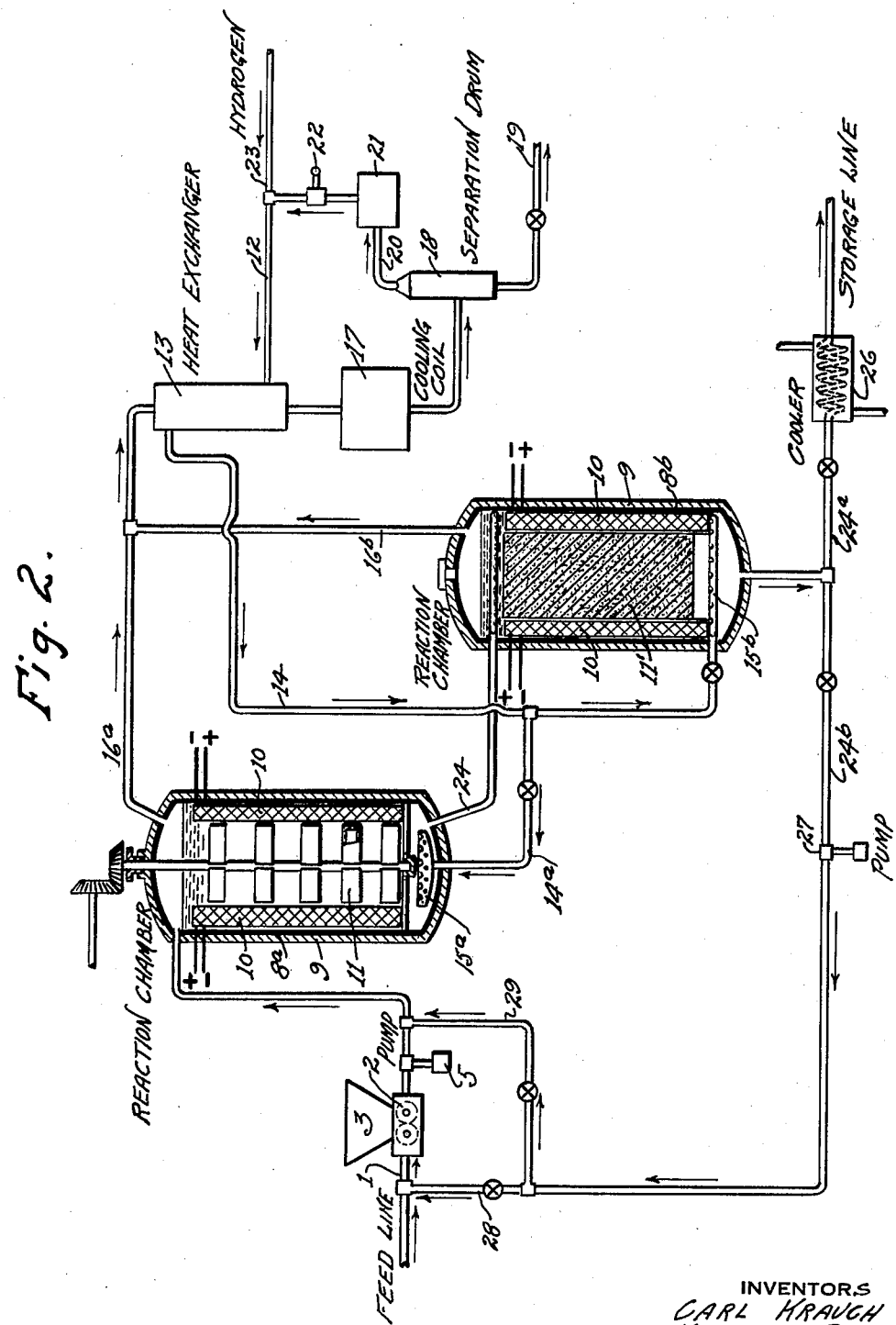

1,904,476

UNITED STATES PATENT OFFICE

CARL KRAUCH, OF LUDWIGSHAFEN-ON-THE-RHINE, AND MATHIAS PIER, OF HEIDELBERG, GERMANY, ASSIGNORS, BY MESNE ASSIGNMENTS, TO STANDARD-I. G. COMPANY, OF LINDEN, NEW JERSEY, A CORPORATION OF DELAWARE

CONVERSION OF SOLID FUELS AND PRODUCTS DERIVED THEREFROM OR OTHER MATERIALS INTO VALUABLE LIQUIDS

Original application filed February 6, 1926, Serial No. 86,646, and in Germany November 7, 1925. Divided and this application filed April 7, 1927. Serial No. 181,887.

One of the most important and widely agitated problems in the industrial world has for a long time been how to produce good gasoline or other valuable liquid fuels from solid fuel including coal in all its varieties and wood, and products of distillation or mineral oils especially heavy oils.

One attempt at the solution of this problem has been made by the so-called liquefaction of coals by means of hydrogen or by destructive hydrogenation of tars or oils under high pressure at high temperature but this has not reached application industrially because of an unsatisfactory speed and rate of the conversion.

By the process described in the specification of the original application No. 86,646 filed February 6th, 1926, of which this is a division, we claim to have successfully solved this problem for the first time and to be able to produce good pure liquid fuels, including also benzines from solid fuels and to convert also tars obtained from solid fuels and also heavy mineral oils, or crude oils, or residues into more valuable liquid products, including benzines, by a process economical in material, time, labour and wear of the apparatus.

In arriving at this result we have made several discoveries or inventions to certain of which this application is directed.

We conceived the idea of applying a catalyst to said solid fuel or other materials, in connection with said hydrogenizing high pressure and high temperature process, but found that an improvement of the process could not be obtained at all or at least not in a continued operation.

Thereafter we discovered that the cause of this drawback was the sulfur present in the treated material, and by experimenting discovered certain catalysts which would work satisfactorily under the existing conditions notwithstanding the presence of the sulfur or sulfur compounds.

Thereupon we found that the apparatus were attacked too rapidly for industrial success due to several influences, chiefly to the presence of sulfur mostly found in the initial materials, and that many troubles in the operations and also other drawbacks were hereby caused, and we discovered that under the conditions existing in the process of hydrogenizing, whether with an addition of the aforementioned or other catalysts or in the absence of catalysts an apparatus composed of or lined with aluminium would behave excellently. Even with materials rich in sulfur, for example Mexican Panuca oil, metallic aluminium as such or in the form of its alloys is not attacked by the contact with hot gaseous, liquid or solid material, and when using it as a lining it may be used until near its melting point.

As examples of aluminium alloys suitable for the construction of apparatus in accordance with the present invention may be mentioned an alloy consisting of 4 per cent of copper, 0.5 per cent of manganese, 0.5 per cent of magnesium and the remainder of aluminium or an alloy consisting of 1.5 per cent of silicon, 0.8 per cent of magnesium, 0.4 per cent of iron and the remainder of aluminium or an alloy consisting of 0.5 per cent of silicon, 3 per cent of copper, 0.6 per cent of manganese, 0.1 per cent of lithium, 0.4 per cent of iron, 12 per cent of zinc and the remainder of aluminium or an alloy consisting of 2.5 per cent of manganese, 2.2 per cent of magnesium, 0.2 per cent of antimony and the remainder of aluminium or an alloy consisting of 8 per cent of copper and the remainder of aluminium, or an alloy consisting of 13 per cent of silicon and the remainder of aluminium.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained from them, whether by ordinary destructive distillation or by low temperature carbonization, or brown coal bitumen, or tars or oils obtained by pressure hydrogenation of solid or liquid fuels, or components or conversion products of all above mentioned materials, such as cracked products, coumarone or any other resins or residues of their distillation, pitch, asphaltum and so on, or mixtures of several such products with each other, also of solids with liquids or of one or more of such products with other suitable organic liquids.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

The gases serving for the reaction may consist of hydrogen alone or of mixtures containing hydrogen, for example a mixture of hydrogen with nitrogen, or water gas, or hydrogen mixed with carbon dioxid, hydrogen sulfide, water vapor or methane or other hydrocarbons. Or the hydrogen may be generated in the reaction chamber by the interaction of water and coal, carbon monoxid, hydrocarbons and the like.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example temperature and pressure employed or duration of the treatment, the products are poor or rich in products of low boiling point. Generally the temperature ranges between 300 and 700° C., and when working under pressure, it should amount to 20, 50 or more atmospheres.

Compounds obtained by the aforedescribed hydrogenation treatment of solid fuels, tars, mineral oils and other materials referred to, which compounds may be comprised by the term destructively hydrogenized fuels are generally very low in sulfur or even completely free therefrom and are excellently suitable for use as fuel for internal combustion engines.

In the accompanying drawings, an apparatus for carrying out the one stage process and an apparatus for carrying out the two stage process, both being continuous, are illustrated diagrammatically, partly in vertical section. Our invention is not limited to the apparatus illustrated therein, however, but may be varied at will in accordance with the conditions of working.

Referring to the drawing in Fig. 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example above 20–100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and, if desired, suitable catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulphide and oil to remove hydrocarbon constituents from gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

Referring now to the drawing in Fig. 2 a suitable system is shown for converting solid materials into light liquid oils by two steps. Where possible, the same numeral has been used in Fig. 2 as has already been indicated in Fig. 1. Hydrocarbon oil is withdrawn from any suitable storage, not shown, by a line 1 and may be forced through a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8 shown in Fig. 1 and similar parts are designated by the same numerals. A heavy liquefied material is withdrawn from the base of the oven 8a and may be continuously discharged into the second oven indicated by 8b. This oven may be packed with a suitable solid catalytic material indicated at 11' and with the exception that no stirring mechanism is used it may be constructed similarly to oven 8a.

Hydrogen is forced under high pressure from the line 12, as before, through a heat exchanger 13 and by line 14 and branches 14a and 14b into oven 8a and 8b respectively. Vaporous products and gas are removed from both ovens by vapor line 16a and 16b respectively which may discharge through a single exchanger 13 to condenser 17. The light oils are separated from the gases in the separator 18 from which the oil is removed by 19 and the gases may be removed, purified and recompressed as indicated in Fig. 1. Heavy oil may be continuously withdrawn from the oven 8b and a part or the whole thereof may be continuously discharged through a line 24a, cooler 26 and conducted by line 25 to any suitable storage. If desired, a part of this oil may be recirculated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25 so as to prevent accumulation within the system. Fresh hydrocarbon oil may be continuously fed in sufficient quantity to carry in the solid material or if desired, a part of the oil withdrawn from the second oven, either containing ash or from which the ash has been removed by filtration, settling centrifugal means or the like may be recirculated for the purpose of bringing in the fresh solid material.

In the following example the time of reaction varies considerably, as might be supposed, depending on the nature of the raw material, the activity of the catalyst, temperature, pressure and the like. In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continuously feeding liquid or difficultly vaporizable oils, the rate of flow may be in the neighborhood of .3 to .8 volumes of oil per hour per volume of the reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 litres per kilogram of carbonaceous material.

All parts of the apparatus liable to assume a temperature above 300° C. are lined with aluminium.

The following example will serve to further explain how our invention is carried out in practice, but we do not restrict our invention to this example.

*Example*

Dark-colored residues of an American rock oil which at ordinary temperature are nearly solid and have a strongly unsaturated character are incorporated with an excess of a gas mixture composed of three parts, by volume, of hydrogen and 1 part of nitrogen and continuously passed under a pressure of 200 atmospheres and a temperature of from 450 degrees to 500 degrees centigrade over a contact mass prepared from an intimate mixture of 70 parts, by weight, of ammonium molybdate and 30 parts of aluminium hydroxid. The reaction vessel containing the said catalytic mass is lined with aluminium as are all other parts of the apparatus liable to assume a high temperature, say of more than 300 degrees centigrade, which lining prevents both a decomposition of the hydrocarbons with a deposition of coke or soot and a destruction of the apparatus by the action of the sulfur compounds contained in the rock oil residues. A nearly colorless, thin and saturated product is obtained besides a little methane, consisting of 90 percent of colorless petrol boiling up to 150 degrees and 10 percent of a mobile, yellowish product of a higher boiling point.

What we claim is:

1. The process of converting carbonaceous substances, such as solid and liquid fuels, distillation and extraction products thereof, into valuable liquids, which comprises subjecting such substances to destructive hydrogenation by means of an added hydrogenating gas and heat at a temperature of between about 300° and 500° C. and at a pressure of at least 20 atmospheres in a reaction vessel, the inner surface of which consists of an alloy of aluminium solid under the conditions of working.

2. The process of converting carbonaceous substances, such as solid and liquid fuels, distillation and extraction products thereof, into valuable liquids, which comprises subjecting such substances to destructive hydrogenation by means of an added hydrogenating gas and heat at a temperature of between about 300° and 500° C. and at a pressure of at least 20 atmospheres in a reaction vessel, the inner surface of which consists of aluminium.

3. The process of converting carbonaceous substances such as solid and liquid fuels, distillation and extraction products thereof into valuable liquids, which comprises subjecting such substances to destructive hydrogenation by means of a hydrogenating gas and heat at a temperature of between about 300° and 500° C. in the presence of a catalyst immune to sulphur poisoning and at a pressure of at least 20 atmospheres and entirely confining the reacting materials by means of surfaces consisting of aluminium.

4. The process of converting carbonaceous substances such as solid and liquid fuels, distillation and extraction products thereof into valuable liquids, which comprises subjecting such substances to destructive hydrogenation by means of a hydrogenating gas and heat at a temperature of between about 300° and 500° C. in the presence of a catalyst immune to sulphur poisoning and at a pressure of at least 20 atmospheres and entirely confining the reacting materials by means of surfaces consisting of an alloy of aluminium solid under the conditions of working.

In testimony whereof we have hereunto set our hands.

CARL KRAUCH.
MATHIAS PIER.